US009026829B2

(12) United States Patent
Weissmann et al.

(10) Patent No.: US 9,026,829 B2
(45) Date of Patent: May 5, 2015

(54) PACKAGE LEVEL POWER STATE OPTIMIZATION

(75) Inventors: Eliezer Weissmann, Haifa (IL); Alon Naveh, Ramat Hasharon (IL); Nadav Shulman, Tel Mond (IL); Hisham Abu Salah, Majdal shams (IL); Dan Baum, Haifa (IL)

(73) Assignee: Intel Corporation, Santa Clara, CA (US)

( * ) Notice: Subject to any disclaimer, the term of this patent is extended or adjusted under 35 U.S.C. 154(b) by 805 days.

(21) Appl. No.: 12/890,652

(22) Filed: Sep. 25, 2010

(65) Prior Publication Data

US 2012/0079304 A1    Mar. 29, 2012

(51) Int. Cl.
G06F 1/26        (2006.01)
G06F 1/32        (2006.01)
G06F 12/08       (2006.01)

(52) U.S. Cl.
CPC .......... *G06F 1/3203* (2010.10); *G06F 12/0804* (2013.01); *G06F 2212/1028* (2013.01)

(58) Field of Classification Search
USPC ......................................... 713/300, 320, 324
See application file for complete search history.

(56) References Cited

U.S. PATENT DOCUMENTS

| | | | | |
|---|---|---|---|---|
| 5,363,496 | A * | 11/1994 | Kato et al. | 711/135 |
| 5,797,022 | A * | 8/1998 | Shimotono et al. | 713/323 |
| 5,931,951 | A * | 8/1999 | Ando | 713/324 |
| 5,954,820 | A * | 9/1999 | Hetzler | 713/323 |
| 6,615,033 | B1 * | 9/2003 | Cragun | 455/502 |
| 7,966,506 | B2 | 6/2011 | Bodas et al. | |
| 8,024,590 | B2 | 9/2011 | Song et al. | |
| 2003/0105983 | A1 * | 6/2003 | Brakmo et al. | 713/320 |
| 2005/0028015 | A1 * | 2/2005 | Asano et al. | 713/320 |
| 2005/0262366 | A1 * | 11/2005 | Ma | 713/300 |
| 2007/0157046 | A1 * | 7/2007 | Samson et al. | 713/323 |
| 2008/0028240 | A1 * | 1/2008 | Arai et al. | 713/300 |
| 2008/0082845 | A1 * | 4/2008 | Morisawa | 713/323 |
| 2008/0184050 | A1 * | 7/2008 | Yamaji et al. | 713/323 |
| 2008/0299979 | A1 * | 12/2008 | Ko et al. | 455/442 |
| 2009/0119527 | A1 * | 5/2009 | Kim | 713/323 |
| 2009/0150695 | A1 | 6/2009 | Song et al. | |
| 2009/0150696 | A1 | 6/2009 | Song et al. | |
| 2009/0158067 | A1 | 6/2009 | Bodas et al. | |
| 2010/0185820 | A1 * | 7/2010 | Hughes et al. | 711/135 |
| 2010/0332877 | A1 | 12/2010 | Yarch et al. | |

OTHER PUBLICATIONS

Hewlett-Packard/Intel Corporation/Microsoft Corporation/Phoenix Technologies Ltd./Toshiba Corporation, Advanced Configuration and Power Interface Specification, Revision 3.0, Sep. 2, 2004, 618 pages.
Hewlett-Packard/Intel Corporation/Microsoft Corporation/Phoenix Technologies Ltd./Toshiba Corporation, Advanced Configuration and Power Interface Specification, Revision 4.0a, Apr. 5, 2010, 731 pages.

* cited by examiner

*Primary Examiner* — Jaweed A Abbaszadeh
*Assistant Examiner* — Phil Nguyen
(74) *Attorney, Agent, or Firm* — Mnemoglyphics, LLC; Lawrence M. Mennemeier

(57) ABSTRACT

Methods and apparatus to optimize package level power state usage are described. In one embodiment, a processor control logic receives a request to enter a lower power consumption state (such as a package level deeper sleep state). The control logic determines the time difference or delta between a last entry into the lower power consumption state and the current time. The control logic then causes the flushing of a last level cache based on a comparison of the time difference and a threshold value corresponding to the lower power consumption state. Other embodiments are also claimed and disclosed.

30 Claims, 5 Drawing Sheets

1
PACKAGE LEVEL POWER STATE OPTIMIZATION

FIELD

The present disclosure generally relates to the field of electronics. More particularly, an embodiment of the invention relates to techniques for optimizing package level power state.

BACKGROUND

To improve power consumption efficiency, some processors may utilize power state setting which are referred to as "C" states. Each state may indicate a certain level of functionality. For example, C0 may indicate the processor is operating, C1 may indicate the processor is not executing instructions but may return to an executing state almost instantaneously, C2 may indicate the processor is to maintain all software-visible information but may take longer to return to full executing state, C3 may indicate the processor is sleep and does not need to keep its cache coherent, etc.

Various number of C states may be used by manufactures to designate these states. Generally, utilizing a lower processor power consumption state may involve a certain amount of overhead or inefficiency, for example, to prepare the processor hardware for entering a lower power consumption state and/or the delay associated with returning the processor hardware to a higher power consumption state.

Accordingly, how the various C states are utilized may have a direct impact on performance of a processor.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
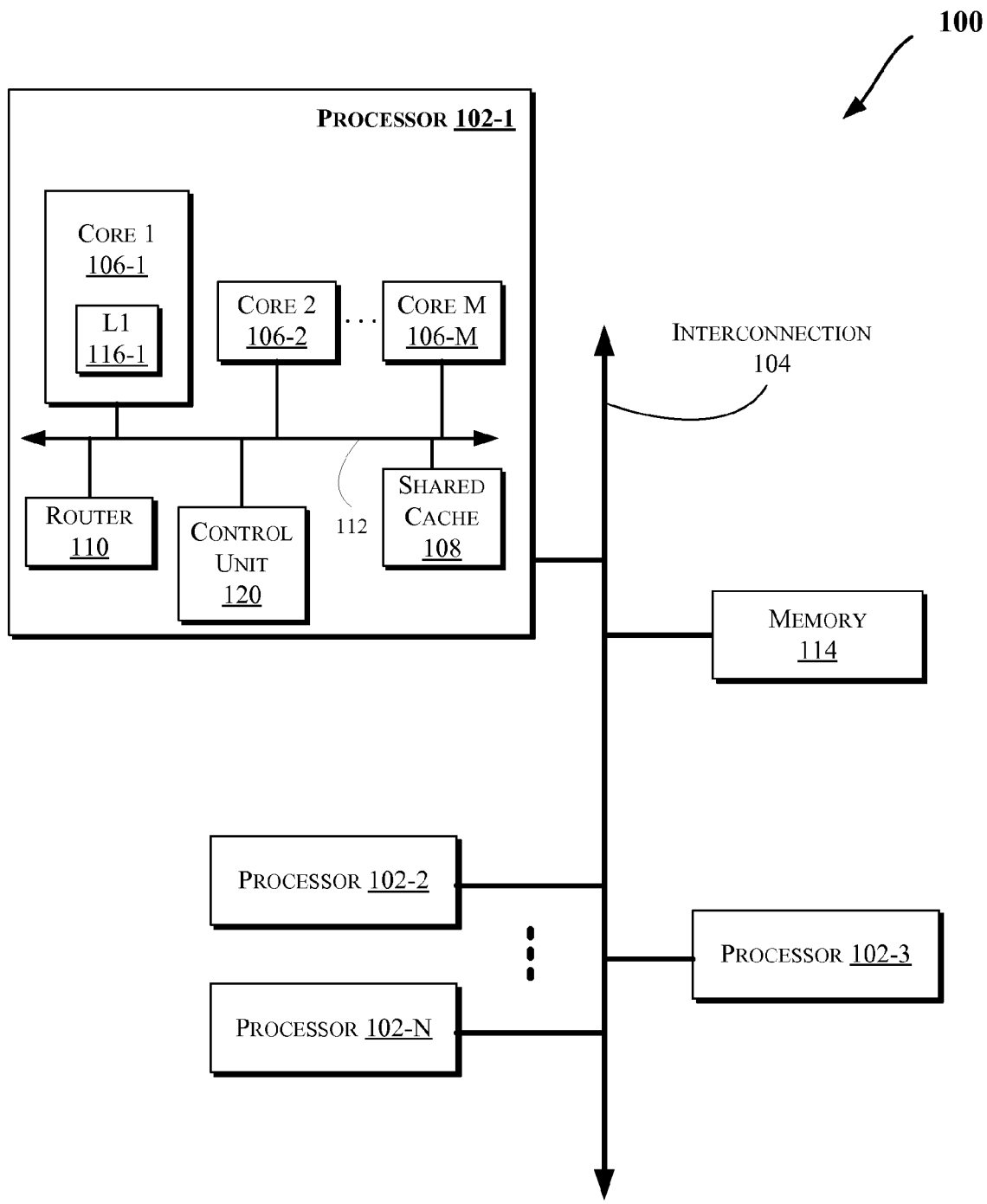
FIGS. 1, 4, and 5 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, the use of "instruction" and "micro-operation" (uop) is interchangeable as discussed herein.

Some of the embodiments discussed herein may be utilized to optimize package level power state utilization. While the above discussed C states may apply to processors (and their cores) only, some embodiments may be applied to package level power consumption states (as well as at any level including a processor level, a device level, globally, etc.). More generally, some of the power consumption states may be in accordance with those defined under Advanced Configuration and Power Interface (ACPI) specification, Revision 4.0a, Apr. 5, 2010. Also, as will be further discussed herein a (semiconductor) package or device may include a processor (with one or more processor cores). In some embodiments, the C states discussed herein may be applied at package level. Furthermore, as discussed above, a number of C states may be used. For example, variations of ACPI C2 and C3 states may include a "deep sleep" state (e.g., C6), a "deeper sleep" state (e.g., C7), etc.

In some implementations, a package level C7 (e.g., deeper sleep) state may include a last level cache flush and voltage reduction (e.g., in a semiconductor package including a processor), while for example a C6 (e.g., deep sleep) state may not include the flush and voltage reduction of C7 state. The overall power saving benefit of C7, when done too frequently, may be quite small or even non-existent. One reason is that flushing the last level cache and reducing the power plane voltage cost energy; thus, reducing the overall power gain of the deep sleep if it occurs too frequently. For instance, when the system is in idle state, it may wake up from time to time to service timer and other interrupts. Powering up the last level cache for each such wakeup further reduces the deep sleep benefit. And, there is also a negative performance impact due to the wakeup and cache warm-up latency. As a result, in some implementations, C7 may save less power than C6 starting at a few hundreds of sleep state entries per second. This renders the blind use of C7 inefficient beyond this point.

To limit some of these issues, in some computing devices, higher package level power states (e.g., C7 as discussed above or other package level power states) may be disabled, for example, by changing Basic Input/Output System (BIOS) settings. However, this may only provide a static change and totally block any use of the disabled power states until the settings are changed, for example. In one embodiment, a dynamic approach is used to determine when to enter a higher package level power state, e.g., based in part on how frequently the higher power state has been entered over a (e.g., configurable) period of time.

The techniques discussed herein may be used in any type of a processor with performance state settings, such as the processors discussed with reference to FIGS. 1 and 4-5. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, a router 110, and/or a processor control logic or unit 120. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 4 and 5), or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116").

In one embodiment, a last level cache (e.g., shared cache 108) may be controlled by the processor control unit 120. The unit 120 may control flushing of the cache ways and/or cache expand operations. This unit 120 may also be aware of the time when all conditions required for cache flush are met, e.g., all cores are in idle state and/or when the Operating System (OS) has requested entry into a deeper idle state (e.g., C7 state), as will be further discussed below with reference to FIG. 3.

Figure 2:
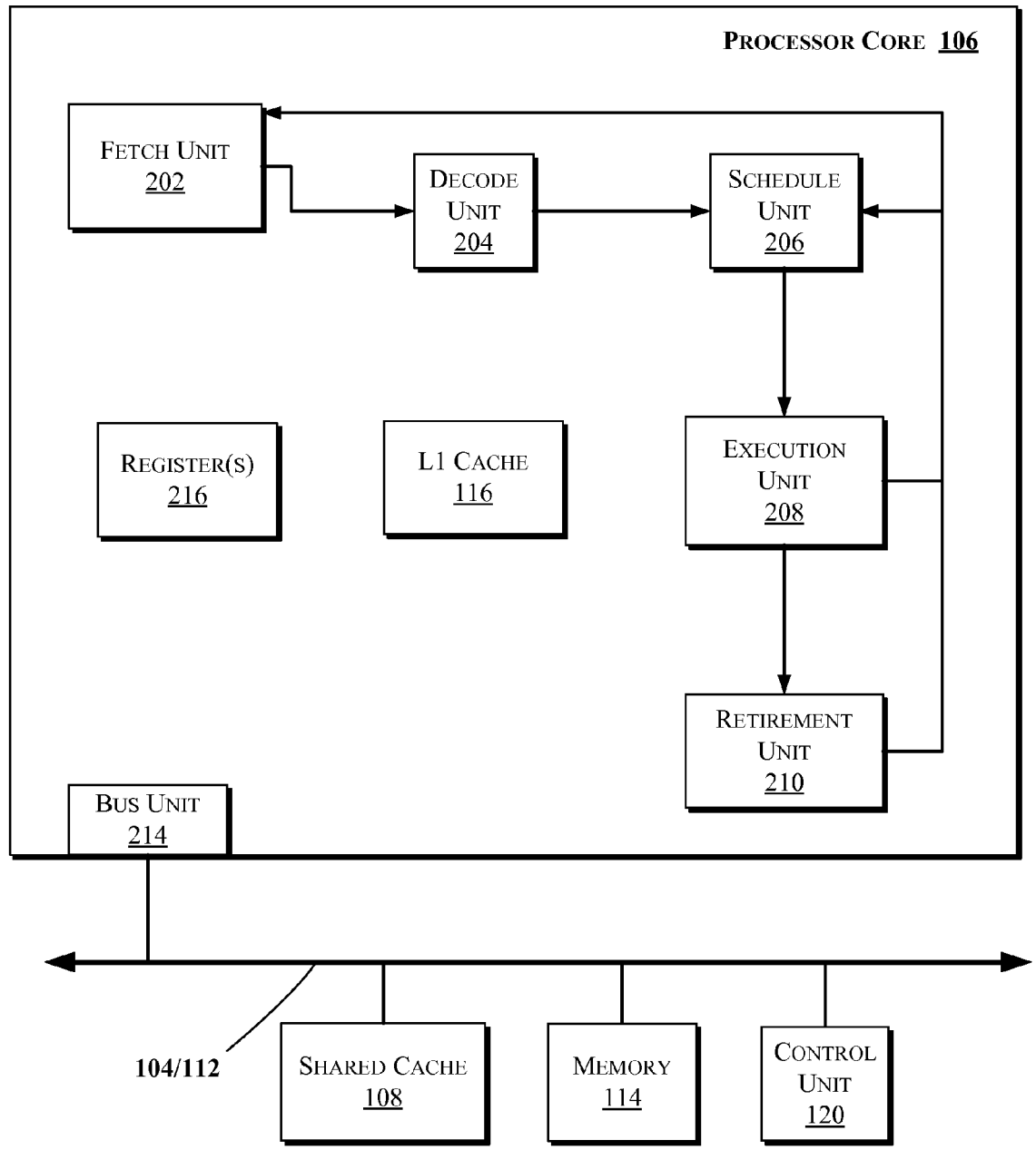
FIG. 2 illustrates a block diagram of portions of a processor core and other components of a computing system, according to an embodiment.

FIG. 2 illustrates a block diagram of portions of a processor core 106 and other components of a computing system, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), control units, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114 and/or the memory devices discussed with reference to FIGS. 4 and 5. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more registers 216 to store data accessed by various components of the core 106 (such as threshold and/or timing values (e.g., discussed with reference to FIG. 3).

Furthermore, even though the shared cache 108 is shown in FIGS. 1-2 to communicate with the processor control unit 120 via the interconnect 112, the cache 108 may also be directly coupled to the control unit 120 in some embodiments. Additionally, the cache 108 may communicate with other components through the control unit 120 in an embodiment.

Figure 3:
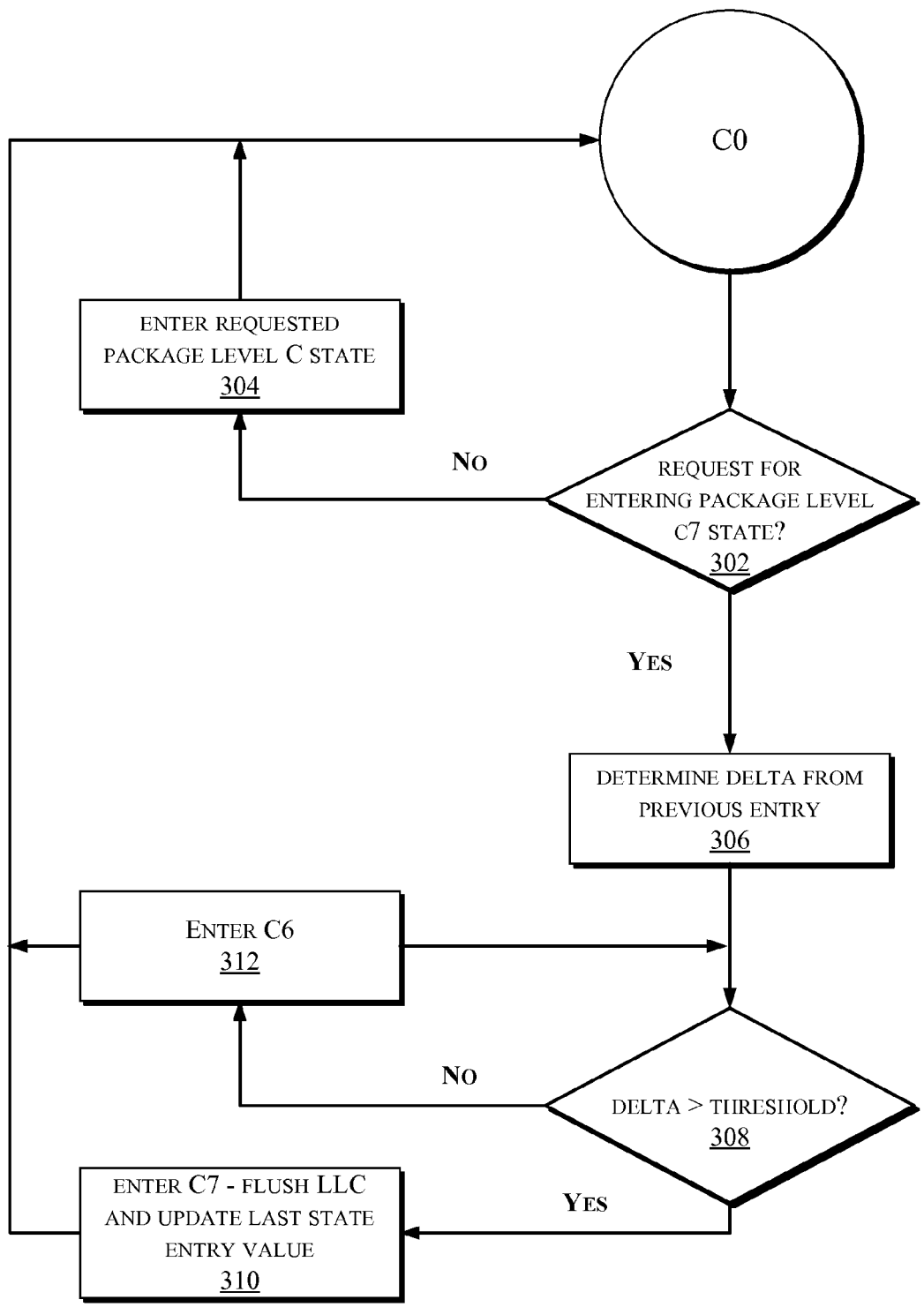
FIG. 3 illustrates a flow diagram in accordance with an embodiment.

FIG. 3 illustrates a flow diagram for entry into a lower power consumption state (such as the C7 state), according to an embodiment. In some embodiments, various components discussed with reference to FIGS. 1-2 and 4-5 may be utilized to perform one or more of the operations discussed with reference to FIG. 3. For example, the processor control unit 120 may be used to control flushing of the LLC cache (e.g., cache 108) and/or power plane voltage change for a semiconductor package (such as the package containing the processor 102-1 of FIG. 1).

Referring to FIGS. 1-3, at an operation 302, it is determined whether a request (e.g., from OS) for entry into a lower package level state corresponds to entry into a C7 state. If the request is for another state, at operation 304, the package is entered into the requested C state. Otherwise, at an operation 306, the difference (or delta) in time between the current time and the time for last entry into the C7 state is determined. At an operation 308, if the determined delta is lager than a C7 time threshold, the package is entered into C7 state (e.g., flushing the LLC cache 108, adjusting the power plane for the package, and/or update the value for the last C7 state entry) at operation 310. Otherwise, at an operation 312, the package is entered into C6 and the package waits until the remaining time period (associated with the C7 threshold of operation 308) has elapsed and then the package enters the C7 state (e.g., after operation 308, operation 310 is performed). As shown in FIG. 3, after operations 304, 310, and 312, the package may return to the C0 state. In some embodiments, exit to C0 state may occur from each package level C state based on any form of internal or external break event (such as a snoop, an interrupt, etc.).

Accordingly, in an embodiment, if the time passed since the previous entry into package deep sleep C state (C7), is smaller than a threshold, the processor control unit 120 defers entry into the C7 state until that threshold is reached. Until then, the control unit 120 may set the sleep state to C6 (demotion). When the threshold time is reached (at operation 308), the processor control unit 120 sets the package to C7 (undemotion).

In an embodiment, the processor control unit 120 takes note of the time it sets the package level C state to C7 (at operation 310, e.g., by storing the corresponding value in a storage location such as a register (including those discussed with reference to FIG. 2) or a memory location in a shared memory (such as memories discussed with reference to FIGS. 1 and/or 4-5), so that it can check whether a subsequent request need to wait.

In an embodiment, the flow of FIG. 3 may not be visible to OS, and further may not require any software intervention. Moreover, some embodiments address challenges encountered on real systems such as interrupts due to input/output. Additionally, the threshold value for operation 308 may be determined based on a variety of factors including: user performance expectations, component types, critical performance requirements (e.g., in server applications may be more geared towards performance in some implementations), or geared towards power savings in other implementations, for example), power saving requirements (e.g., mobile devices running on batteries may be more geared towards power savings instead of performance), limiting the OS request into the optimal performance or power consumption levels, or combinations thereof.

Figure 4:
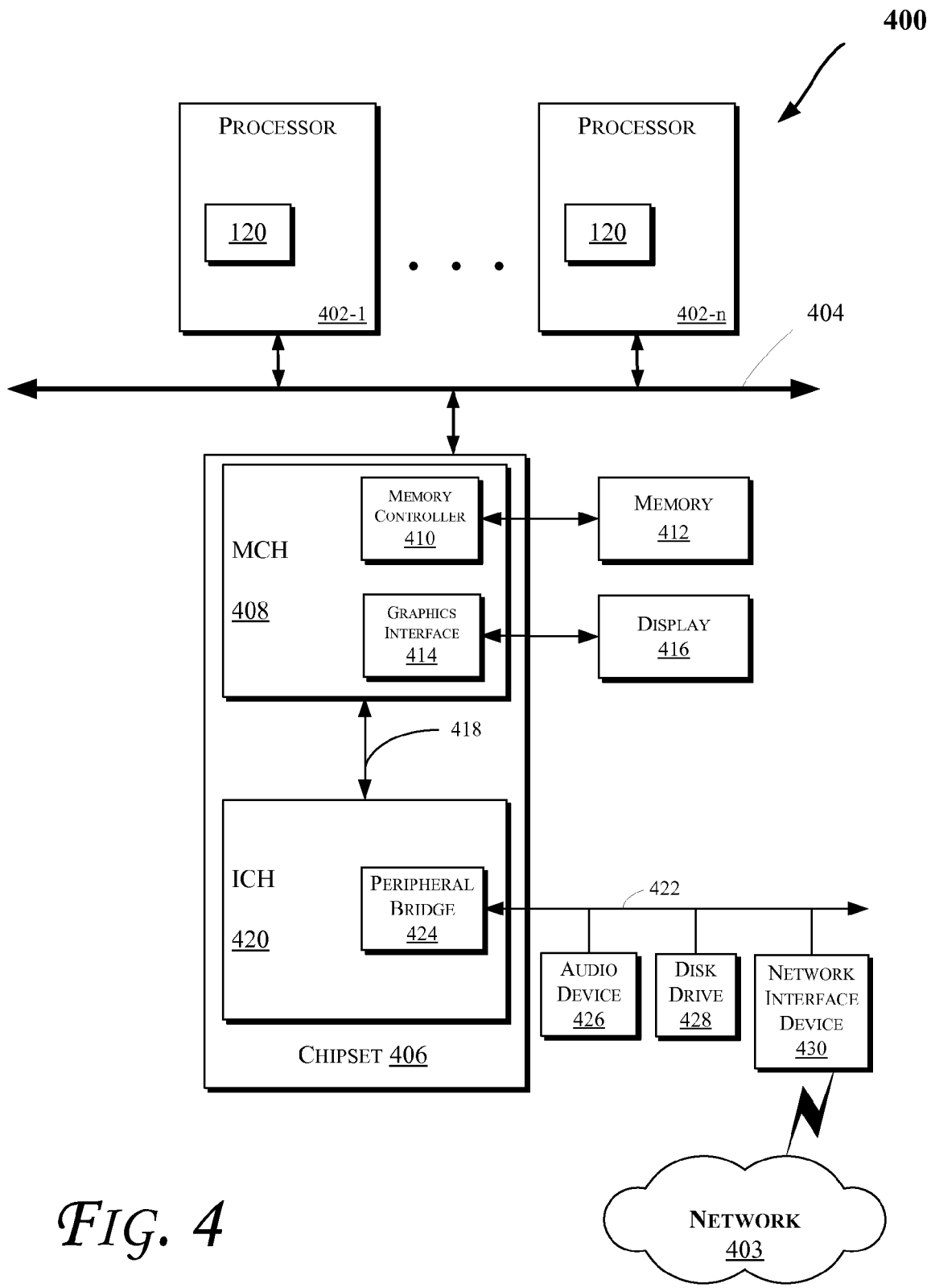

FIG. 4 illustrates a block diagram of a computing system 400 in accordance with an embodiment of the invention. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. For example, one or more of the processors 402 may include the control unit 120 discussed with reference to FIGS. 1-3. Also, the operations discussed with reference to FIGS. 1-3 may be performed by one or more components of the system 400.

A chipset 406 may also communicate with the interconnection network 404. The chipset 406 may include a memory control hub (MCH) 408. The MCH 408 may include a memory controller 410 that communicates with a memory 412 (which may be the same or similar to the memory 114 of FIG. 1). The memory 412 may store data, including sequences of instructions, that may be executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display device 416. In one embodiment of the invention, the graphics interface 414 may communicate with the display device 416 via an accelerated graphics port (AGP). In an embodiment of the invention, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the MCH 408 and an input/output control hub (ICH) 420 to communicate. The ICH 420 may provide an interface to I/O device(s) that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the MCH 408 in some embodiments of the invention. In addition, the processor 402 and the MCH 408 may be combined to form a single chip. Furthermore, the graphics accelerator 416 may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
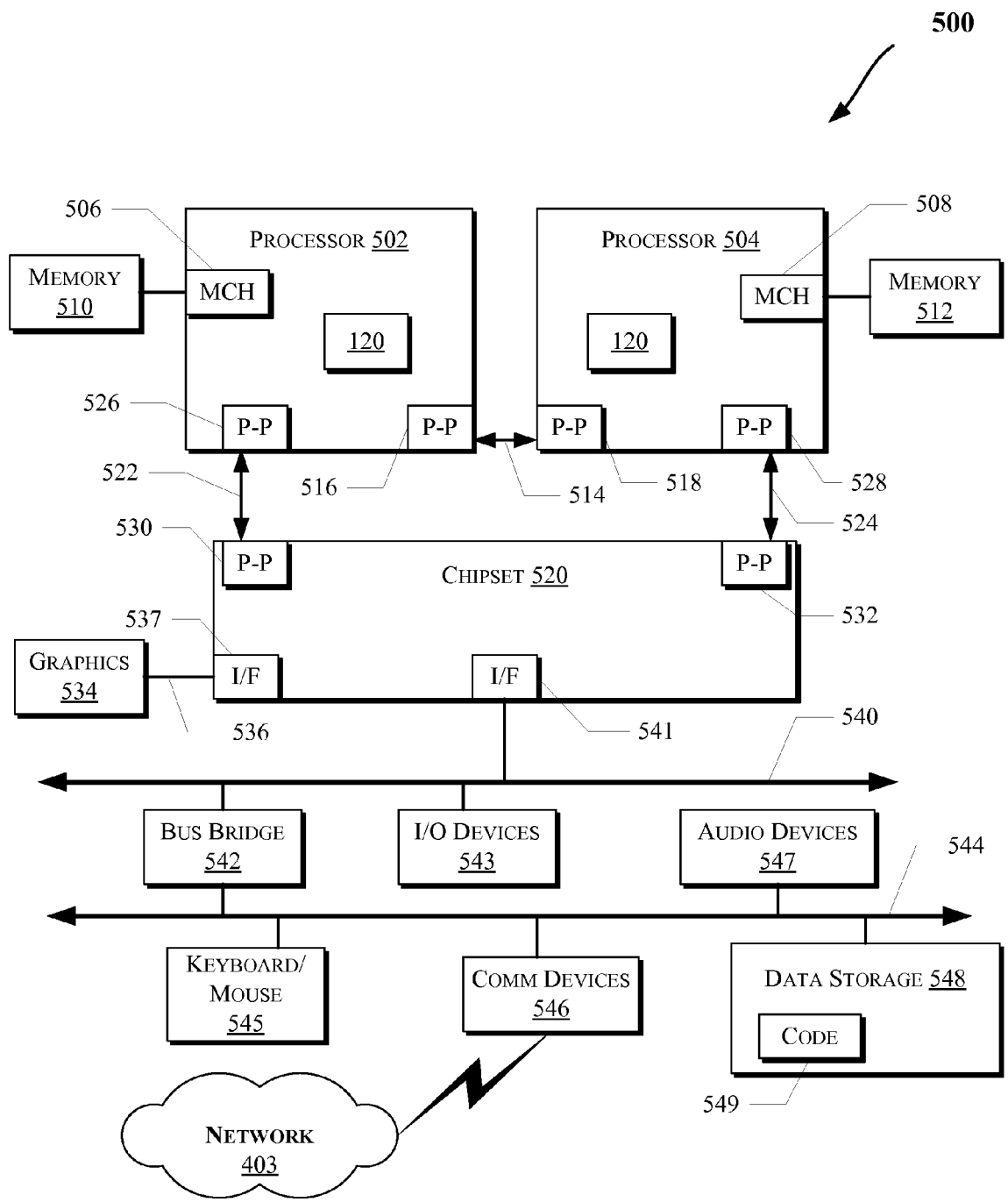

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-topoint (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment of the invention may be provided within the processors 502 and 504. For example, the control unit 120 of FIGS. 1-3 may be located within the processors 502 and 504. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device 547, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., logic circuitry), software, firmware, or combinations thereof, which may be provided as a computer program product, e.g., including (e.g., a non-transitory) machine-readable or computer-readable medium having stored thereon instructions (or software procedures) used to program a computer to perform a process discussed herein. The machine-readable medium may include a storage device such as those discussed with respect to FIGS. 1-5.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
a cache; and
a control logic, coupled to the cache, to receive a request to enter a lower power consumption state,
wherein the control logic is to determine a time difference between a last entry into the lower power consumption state and a current time, and
wherein the control logic is to cause a flush of the cache based on a comparison of the time difference and a threshold value corresponding to the lower power consumption state.

2. The processor of claim 1, wherein the lower power consumption state is a deeper sleep state.

3. The processor of claim 1, wherein the control logic is to not cause the flush of the cache in response to the comparison indicating the threshold value has not been met.

4. The processor of claim 1, wherein the lower power consumption state is a deeper sleep state and wherein the control logic is to cause entry into a deep sleep state instead of the deeper sleep state in response to the comparison indicating the threshold value has not been met.

5. The processor of claim 4, wherein the deeper sleep state is entered after a determination that the threshold value has been met.

6. The processor of claim 1, wherein the control logic is to receive the request from an operating system.

7. The processor of claim 6, further comprising a memory to store the operating system.

8. The processor of claim 1, wherein the control logic is to cause: an update to a time value corresponding to the last entry into the lower power consumption state, or an adjustment to a power plane voltage of a semiconductor package that comprises the processor.

9. The processor of claim 1, further comprising a plurality of processor cores.

10. A method comprising:
receiving a request to enter a lower power consumption state;
determining a time difference between a last entry into the lower power consumption state and a current time, and
causing a flush of a last level cache based on a comparison of the time difference and a threshold value corresponding to the lower power consumption state.

11. The method of claim 10, wherein the lower power consumption state is a deeper sleep state.

12. The method of claim 10, further comprising not causing the flush of the cache in response to the comparison indicating the threshold value has not been met.

13. The method of claim 10, wherein the lower power consumption state is a deeper sleep state, further comprising causing entry into a deep sleep state instead of the deeper sleep state in response to the comparison indicating the threshold value has not been met.

14. The method of claim 13, further comprising entering the deeper sleep state after a determination that the threshold value has been met.

15. The method of claim 10, further comprising updating a time value corresponding to the last entry into the lower power consumption state or adjusting a power plane voltage of a semiconductor package.

16. A computing system comprising:
a last level cache; and
a processor, coupled to the last level cache, the processor comprising:
a control logic to receive a request to enter a lower power consumption state, wherein the control logic is to determine a time difference between a last entry into the lower power consumption state and a current time, and wherein the control logic is to cause a flush of the last level cache based on a comparison of the time difference and a threshold value corresponding to the lower power consumption state.

17. The system of claim 16, wherein the lower power consumption state is a deeper sleep state.

18. The system of claim 16, wherein the control logic is to not cause the flush of the cache in response to the comparison indicating the threshold value has not been met.

19. The system of claim 16, wherein the lower power consumption state is a deeper sleep state and wherein the control logic is to cause entry into a deep sleep state instead of the deeper sleep state in response to the comparison indicating the threshold value has not been met.

20. The system of claim 19, wherein the deeper sleep state is entered after a determination that the threshold value has been met.

21. The system of claim 16, wherein the control logic is to receive the request from an operating system.

22. The system of claim 21, further comprising a memory to store the operating system.

23. The system of claim 16, wherein the control logic is to cause: an update to a time value corresponding to the last entry into the lower power consumption state, or an adjustment to a power plane voltage of a semiconductor package that comprises the processor.

24. The system of claim 15, further comprising an audio device coupled to the processor core.

25. A computer-readable non-transitory medium to store instructions that when executed by a processor cause the process to:
   receive a request to enter a lower power consumption state;
   determine a time difference between a last entry into the lower power consumption state and a current time, and
   cause a flush of a last level cache based on a comparison of the time difference and a threshold value corresponding to the lower power consumption state.

26. The computer-readable non-transitory medium of claim 25, wherein the lower power consumption state is a deeper sleep state.

27. The computer-readable non-transitory medium of claim 25, wherein the instructions are to cause the processor to not cause the flush of the cache in response to the comparison indicating the threshold value has not been met.

28. The computer-readable non-transitory medium of claim 25, wherein the lower power consumption state is a deeper sleep state, wherein the instructions are to cause the processor to cause entry into a deep sleep state instead of the deeper sleep state in response to the comparison indicating the threshold value has not been met.

29. The computer-readable non-transitory medium of claim 28, wherein the instructions are to cause the processor to enter the deeper sleep state after a determination that the threshold value has been met.

30. The computer-readable non-transitory medium of claim 25, wherein the instructions are to cause the processor to update a time value corresponding to the last entry into the lower power consumption state or to adjust a power plane voltage of a semiconductor package.

* * * * *